US006254078B1

(12) United States Patent
Taruki (10) Patent No.: US 6,254,078 B1
(45) Date of Patent: Jul. 3, 2001

(54) AUTOMATIC DOCUMENT FEEDER FOR AN IMAGE FORMING APPARATUS

(75) Inventor: Takashi Taruki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/459,647

(22) Filed: Dec. 13, 1999

(30) Foreign Application Priority Data

Dec. 17, 1998 (JP) .................................................. 10-359789

(51) Int. Cl.$^7$ ...................................................... B65H 5/22
(52) U.S. Cl. ...................... 271/3.01; 271/3.13; 271/4.01; 271/265.01
(58) Field of Search .................................. 271/3.01, 3.13, 271/3.14, 4.01, 265.01, 273, 176, 314

(56) References Cited

U.S. PATENT DOCUMENTS

| 5,072,923 | * | 12/1991 | Coy ................................. 271/273 X |
| 5,181,705 | * | 1/1993 | Ueda et al. ....................... 271/176 X |
| 5,197,724 | * | 3/1993 | Kitajima et al. .................... 271/3.01 |
| 5,211,386 | * | 5/1993 | Baba .................................. 271/3.01 |

FOREIGN PATENT DOCUMENTS

| 7-120094 | 12/1995 | (JP) . |
| 2515306 | 8/1996 | (JP) . |

* cited by examiner

Primary Examiner—David H. Bollinger
(74) Attorney, Agent, or Firm—Oblon, Spivak, McClelland, Maier & Neustadt, P.C.

(57) ABSTRACT

An ADF (Automatic Document Feeder) for an image forming apparatus includes a drive roller and a driven roller constituting document send-out means located downstream of a contact glass for sending out a document. The driven roller is movable into and out of contact with the drive roller. The driven roller is spaced from the drive roller when a document sensor does not sense the arrival of the leading edge of the document at the document send-out means. When the document sensor senses the leading edge of the document, the driven roller is moved toward the drive roller in order to convey the document in cooperation with the drive roller. The ADF insures accurate reading of the document without varying the document conveying speed at an image reading position.

11 Claims, 7 Drawing Sheets

| | DRIVE ROLLER 33 | RELATION | DRIVEN ROLLER 50 |
|---|---|---|---|
| COEFFICIENT OF FRICTION | $\mu 1 \fallingdotseq 0.3$ OR LESS | ≪ | $\mu 2 \fallingdotseq 1.0$ OR LESS |
| OUTSIDE DIAMETER | D1 | < | D2 |
| PRESSURE | P1 | ≫ | P2 |
| MATERIAL | POLYACETAL | — | FOAM URETHANE RUBBER |

AUTOMATIC DOCUMENT FEEDER FOR AN IMAGE FORMING APPARATUS

BACKGROUND OF THE INVENTION

The present invention relates to an ADF (Automatic Document Feeder) mounted on an image forming apparatus and more particularly to an ADF of the type sending out a document via an image reading position while warping it.

An ADF of the type described is conventional with a copier, facsimile apparatus or similar image forming apparatus. Japanese Patent Laid-Open Publication No. 10-72141, for example, discloses ADF applicable to an image forming apparatus of the type reading a document by receiving a reflection from the document while holding optics in a halt below a slit glass shorter than the document. The ADF taught in this document conveys a document via the slit glass in a so-called sheet-through fashion.

Another conventional ADF is applicable to an image forming apparatus of the type stopping a document on a contact glass having a greater area than the document, and then moving optics to scan the document. Such an ADF sends a document to the contact glass, stops the document at the contact glass, and then sends it out after the document has been read.

In any case, should a document be conveyed in a plane that is the extension of the image reading position, the overall area of the ADF would increase. To make the ADF compact, it has been customary to send in a document to the image reading position while warping and reversing it from above the reading position, send it out from the image reading position while also warping it, and again reversing, if necessary, the document before the document is driven out to a tray.

The prerequisite with the sheet-through type ADF is that it conveys a document being read at a constant speed because the document conveying speed has critical influence on reading accuracy. In practice, however, the leading edge of a document moved away from the glass platen advances along a guide surface, abuts against one of a pair of rollers located downstream of the guide surface, and then enters a nip between the rollers. Generally, each roller has a smooth surface implemented by resin so as not to contaminate a document. This, coupled with resistance ascribable to the curvature of the roller, causes the document to slip on the roller before entering the above nip. The slip effects the document conveying speed and causes the document to temporarily stay at the reading position, causing the resulting image to be elongated.

Technologies relating to the present invention are also disclosed in, e.g., Japanese Patent Publication No. 7-120094 and Japanese Utility Model Publication No. 2,515,306.

SUMMARY OF THE INVENTION

It is therefore an object of the present invention to provide a sheet-through type ADF for an image forming apparatus capable of preventing a document from temporarily staying at an image reading position and elongating an image, and insuring reliable conveyance and accurate reading of the document with a miniature configuration.

An ADF of the present invention includes a document send-in device for sending a document to an image reading position, a document send-out device including a pair of rollers for sending out the document being sequentially read at the image reading position, and a document sensor for sensing the arrival of the leading edge of the document at the document send-out device. One of the pair of rollers is movable toward and away from the other roller. The one roller is spaced from the other roller when the document sensor does not sense the leading edge of the document or moved toward the other roller when the document sensor senses the leading edge.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
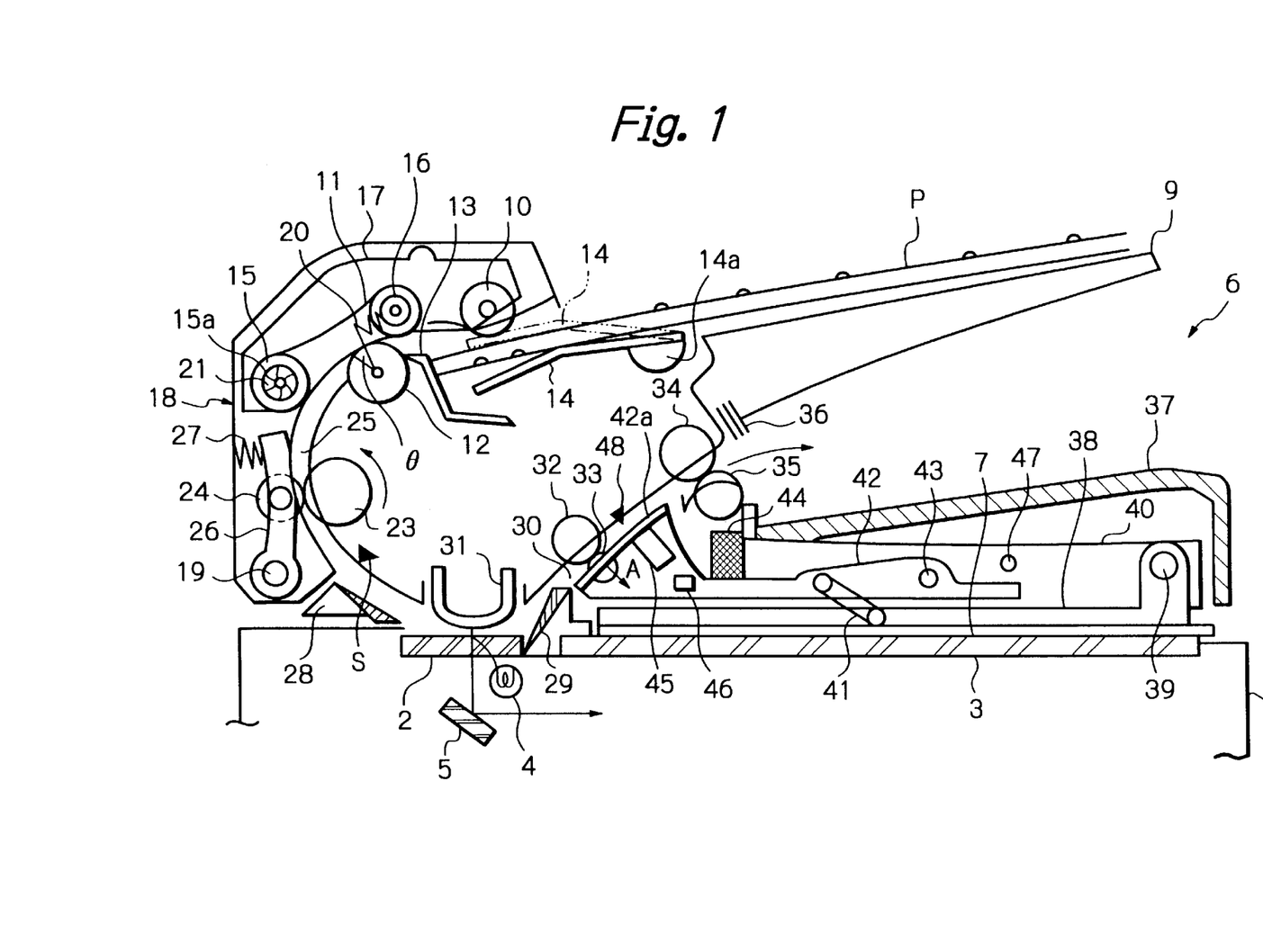
FIG. 1 is a view showing the general construction of an ADF embodying the present invention.

Referring to FIG. 1 of the drawings, an ADF embodying the present invention is shown. As shown, the ADF, generally 6, is mounted on a scanner section or image reading device included in a copier by way of example. The scanner section of the copier will be briefly described first.

As shown in FIG. 1, the copier, generally 1, has on its top a slit glass 2 and a contact glass 3 each defining a document reading position. The scanner section includes a lamp 4 and a first mirror 5 positioned below the slit glass 2 and contact glass 3. When a document is set on the glass platen 3, the scanner section cause the lamp 4 and first mirror 5 to move in the right-and-left direction in FIG. 1 so as to read the document. On the other hand, to read a document through the slit glass 2, the scanner section holds the lamp 4 and first mirror 5 in a halt below the slit glass 2. In any case, while the lamp 4 illuminates the document, the resulting reflection from the document is incident to a CCD (Charge Coupled Device) or similar image sensor, not shown, via the first mirror 5 and optics, not shown, including other mirrors and a lens, as well known in the art.

The ADF 6 has a reflector 7 at its bottom. The reflector 7 presses the document set on the glass platen 3 while covering the document. In addition, the reflector 7 serves as a white reference in the event of reading the document. The ADF 6 is hinged to the copier 1 in such a manner as to be movable toward and away from the top of the copier 1.

A document tray 9 is positioned on the top of the ADF 9 to be loaded with a stack of documents P to be read. A pickup roller 10 rests on the top of the document stack and rotates to pay out the top document P to a nip or separating position between a feed belt 11 and a reverse roller 12. While the belt 1 is moved in one direction for feeding the top document P, the reverse roller 12 is rotated in the opposite direction in order to separate the top document P from the underlying documents.

A stop member 13 is positioned downstream of the pickup roller 10 in the direction in which the document P is fed (direction of document feed hereinafter). The documents P stacked on the document tray 9 abut against the stop 13 and are thereby prevented from advancing toward the feed belt 11. The feed belt 11 is pressed against the reverse roller 12 at a suitable angle θ.

A presser plate 14 is positioned below the pickup roller 10. A solenoid, not shown, causes the presser plate 14 to rotate about a fulcrum 14a such that the free end of the plate 14 moves toward or away from the pickup roller 10, as needed. The fulcrum 14a is positioned upstream of the pickup roller 10 in the direction of document feed. Specifically, the pressure plate 14 is movable between a position indicated by a solid line in FIG. 1 and a position indicated by a phantom line in FIG. 1. When a copy start switch, not shown, provided on the copier 1 is pressed, the presser plate 14 spaced from the pickup roller 10 (solid line position) is brought into contact with the pickup roller 10 (phantom line position), pressing the document P against the pickup roller 10. As a result, the pickup roller 10 in rotation pays out the top sheet P.

The feed belt 11 is passed over a drive roller 15 and a driven roller 16 and accommodated in a case 17. The drive roller 15 is mounted on a rotatable shaft 15a removably mounted to the body of the ADF 6 (ADF body hereinafter). A one-way clutch 21 is arranged between the drive roller 15 and the shaft 15a. The drive roller 15 is rotatable clockwise in FIG. 1 via the one-way clutch 21 so as to drive the belt 11.

A spring 20 constantly biases the driven roller 16 away from the drive roller 15, causing a preselected degree of tension to act on the belt 11. The case 17 is angularly movably supported by the shaft 15a. The pickup roller 10 is also mounted on the case 17 and connected to the shaft 15a by drive transmitting means not shown. An openable cover 18 positions the case 17 by pressing it. The case 17 so positioned by the cover 18 presses the belt 11 against the reverse roller 12 and thereby positions the pickup roller 10 also. When the cover 18 is opened, the case 17 angularly moves about the shaft 15a in the same direction as the cover 18 with the result that the space above the pickup roller 10 and feed belt 11 is uncovered. The cover 18 is rotatable about a fulcrum 19.

The rotation of the shaft 15a is transferred to the pickup roller 10 via a gap clutch not shown. The gap clutch included a meshing portion configured such that while the shaft 15a rotates by a preselected angle, the rotation of the shaft 15a is transferred to the pickup roller 10. Conversely, when the pickup roller 10 is caused to rotate by the document P being fed by the feed belt 11, the meshing portion of the gap clutch is uncoupled. It follows that after the trailing edge of the top document P has moved away from the pickup roller 10, the rotation of the shaft 15a is not transferred to the pickup roller 10 until the shaft 15a rotates by the preselected angle. This is successful to provide an interval between the trailing edge of the above document P and the leading edge of the document P to be fed next.

If desired, the above gap clutch may be replaced with an electromagnetic clutch or a spring clutch capable of driving the drive roller and pickup roller 10.

A motor, not shown, causes a first feed roller or drive roller 23 and therefore a driven roller 24 contacting the feed roller 23 to rotate. The document P separated from the underlying documents P by the feed belt 11 and reverse roller 12 is brought to a nip between the rollers 23 and 24. The rollers 23 and 24 convey the document P along a reverse path 25. As a result, the document P is fed toward the slit glass 2 while being reversed by the reverse path 25. The driven roller 24 is mounted on a lever 26 that is rotatable about the fulcrum 19 of the cover 18. A spring 27 anchored to the cover 18 constantly biases the lever 26 against the drive roller 23.

A registration sensor S is responsive to the leading edge of the document P. The output of the registration sensor S is used to stop the following document for thereby matching it to the delivery of the preceding document.

A reverse guide 28 guides the document P being conveyed by the first feed roller 23 and driven roller 24 toward the slit glass 2. The leading edge of the document P moved away from the slit glass 2 slidingly contacts a reverse outlet guide 29. The reverse outlet guide 29 scoops up the leading edge of the document P and thereby guides the document P into an outlet path 30 while causing it to warp. A second feed roller or drive roller 32 and a driven roller 33 are disposed in the outlet path 30 and convey the document P away from the slit glass 2. Finally, an outlet roller 34 and a driven roller 35 cooperate to drive the document P out of the outlet path 30 onto an outside cover 37. At this instant, a discharge brush 36 discharges the document P.

In the above construction, the first feed roller 23 and driven roller 24 constitute document send-in means while the second feed roller 32 and driven roller 33 constitute document send-out means. In addition, the reverse outlet guide 29 constitutes a first guide member.

When the document P moves over the slit glass 2, the lamp 4 and first mirror 5 as well as other optical elements read the image of the document P. A reflection guide 31 is positioned at an image reading position assigned to the slit glass 2. The reflection guide 31 maintains a distance between the slit glass 2 and the document P constant. Further, the reflection guide 31 cooperates with the reverse guide 28 and reverse outlet guide 29 to form part of the document path between the reverse path 25 and the outlet path 30. In addition, the reflection guide 31 plays the role of a white reference and a reflector for reflecting light issuing from the lamp 4 during image reading.

The second feed roller 32 conveys the document P at a higher speed than the first feed roller 23. This, coupled with the restoration of the document P being caused to warp by the reverse outlet guide 29, causes the document P to move along the reflection guide 31 at a preselected distance above the slit glass 2.

On the other hand, the reflector 7 for covering the contact glass 3 is mounted on the underside of a presser plate 38. The presser plate 38 presses a document laid on the contact glass 3 against the contact glass 3. The presser plate 38 is mounted on a main frame 40 in such a manner as to be rotatable about a fulcrum 39. The main frame 40 is mounted on the shaft of the driven roller 35 at one end thereof and affixed to the ADF body thereby.

The main frame 40 has an area great enough to cover the contact glass 3. The outside cover 37 mentioned earlier is mounted on the top of the main frame 40 and constitutes a tray for receiving the documents P in combination with the main frame 40. The presser plate 38 is connected to an auxiliary frame 42 by a link 41. The auxiliary frame 42 has a generally U-shaped configuration embracing the main frame 40 and connected to the main frame 40 in such a manner as to be rotatable about a fulcrum 43. A magnet 44 is mounted on the main frame 40 and constantly attracts the auxiliary frame 42.

The auxiliary frame 42 may be entirely formed of metal or may be formed of plastics or similar elastic material except for its portion to be attracted by the magnet 44. The left end of the auxiliary frame 42, as viewed in FIG. 1, is implemented as a guide plate 42a forming part of the outlet path 30. A driven roller 33 is rotatably mounted on the guide plate 42a. Specifically, the guide plate 42a constitutes a second guide member for guiding the leading edge of the document P steered by the reverse outlet guide 29 toward the nip between the second feed roller 32 and the driven roller 33.

A stamp unit 45 is mounted on the guide plate 42a and includes a retractable stamp and a solenoid for driving the stamp although not shown specifically. When the solenoid causes the stamp to protrude from the stamp unit 45, the stamp stamps "COPIED" or similar message on the document moved away from the slit glass 2 at a preselected downstream position of the document in the direction of document feed. With the above stamp, it is possible to confirm the end of reading or the simultaneous feed of two or more documents.

A knob 46 protrudes from the auxiliary frame 42 in the vicinity of the guide plate 42a and can be held by hand. A stop 47 protrudes from the main frame 40. When the base end (right end as viewed in FIG. 1) abuts against the stop, the stop 47 prevents the auxiliary frame 42 from rotating counterclockwise about the fulcrum 43 by more than a preselected amount.

Figure 2:
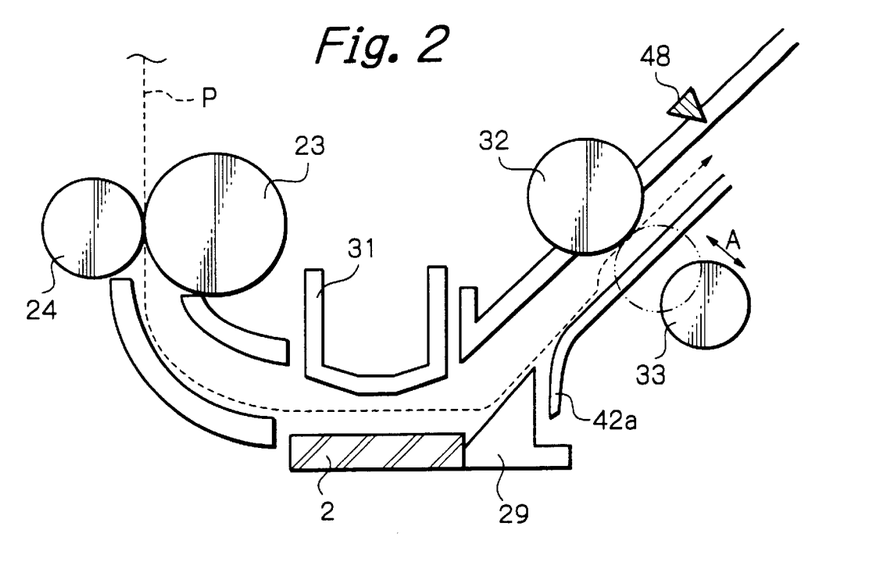
FIG. 2 is a fragmentary enlarged view of the illustrative embodiment.

As also shown in FIG. 2, a document sensor or document sensing means 48 is positioned just downstream of the second feed roller 32 and driven roller 33 constituting the document send-out means. The driven roller 33 is movable in a direction indicated by an arrow in FIG. 2 between an inoperative position indicated by a solid line and an operative position indicated by a dash-and-dots line. In the inoperative position, the driven roller 33 is spaced from the second feed roller 32. In the inoperative position, the driven roller 33 adjoins the second feed roller 32 or contacts it when a document is absent.

Figure 11:
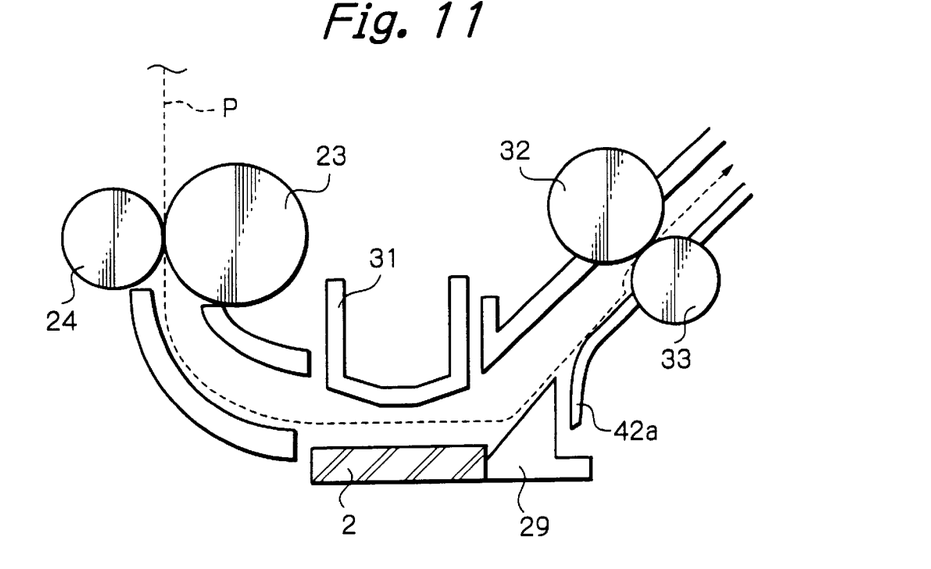
FIG. 11 is a fragmentary enlarged view of a conventional sheet-through type ADF.

For comparison, part of a conventional sheet-through type ADF corresponding to the above part of the illustrative embodiment is shown in FIG. 11. As shown, the conventional ADF does not include the document sensor 48 and does not cause the driven roller 33 to move toward or away from the second feed roller 32. In FIG. 11, the leading edge of a document conveyed via the slit glass 2 by the first feed roller 23 and driven roller 24, FIG. 1, contacts the reversal outlet guide 29 and is guided along the guide 29. Subsequently, the leading edge of the document is brought into contact with the guide plate 42 and conveyed thereabong. On contacting the driven roller 33, the leading edge of the document is guided to the nip between the second feed roller 32 and the driven roller 33 due to the rotation of the driven roller 33.

The driven roller 33 has a smooth surface implemented by resin so as not to contaminate the document P. This, coupled with the resistance of the driven roller 33 due to a curvature, causes the leading edge of the document P to slip on contacting the driven roller 33 and then reach the nip between the second feed roller 32 and the driven roller 33. Consequently, the document P temporarily stays at the image reading position above the slit glass 2, resulting in an elongated image.

By contrast, in the illustrative embodiment, the driven roller 33 is movable toward and away from the second feed roller 32, and the document sensor 48 is located downstream of the driven roller 33 in order to sense the leading edge of the document P. The driven roller 33 remains at the solid line position shown in FIG. 2 until the leading edge of the document P reaches the gap between the feed roller 32 and driven roller 33. The leading edge of the document P therefore moves away from the feed roller 32 and driven roller 33 without contacting or slipping on the driven roller 33. When the document sensor 48 senses the leading edge of the document P, an electric circuit, not shown, causes a solenoid or similar actuator, not shown, to move the driven roller 33 to the dash-and-dots line position of FIG. 2. As a result, the driven roller 33 conveys the document P in cooperation with the feed roller 32. This is successful to prevent the leading edge of the document P from slipping when it enters the nip between the two rollers 32 and 33.

Figure 3:
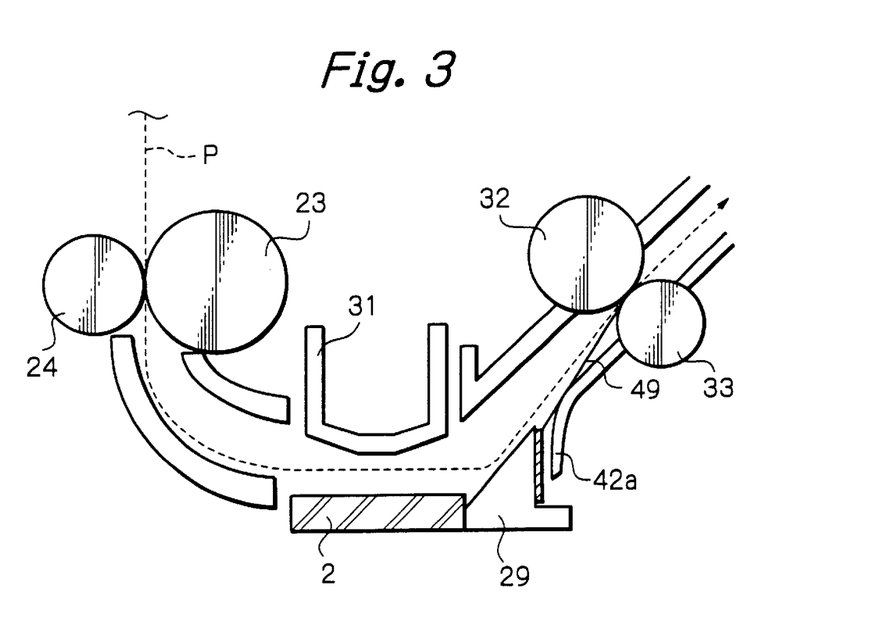
FIG. 3 is a view similar to FIG. 2, showing an alternative embodiment of the present invention.

An alternative embodiment of the present invention will be described with reference to FIGS. 3 and 4. As shown, this embodiment does not include the document sensor 48 and does not move the driven roller 33 toward or away from the second feed roller 32, i.e., maintains it in a position indicated by a solid line in FIG. 3. An elastic guide plate 49 is affixed to the side surface of the reversal outlet guide at one end thereof. The other end of the guide plate 49 extends to the nip between the feed roller 32 and the driven roller 33. In this configuration, the leading edge of the document P being conveyed by the first feed roller 23 and driven roller 24 is directly guided to the nip between the second feed roller 32 and the driven roller 33 by the guide plate 49. This is also successful to prevent the leading edge of the document P from slipping on the driven roller 33.

The elastic guide plate 49 should preferably be implemented by, e.g., a polyester film exerting a minimum of frictional force in order to protect the document P from defective conveyance and contamination.

Figure 4:
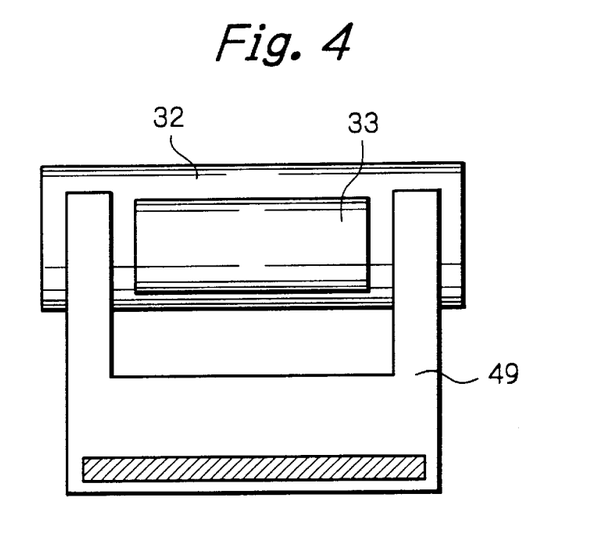
FIG. 4 is a fragmentary bottom view of a part of the embodiment shown in FIG. 3.

FIG. 4 shows the characterizing part of the illustrative embodiment in a bottom view. As shown, the elastic guide plate 49 is bifurcated to extend to the outside of opposite axial ends of the driven roller 33. With this configuration, the guide plate 49 is capable of surely guiding the leading edge of the document P to the nip between the two rollers 32 and 33 while allowing a sufficient conveying force to act on the document P. As for the rest of the construction, this embodiment is identical with the previous embodiment.

Figure 5:
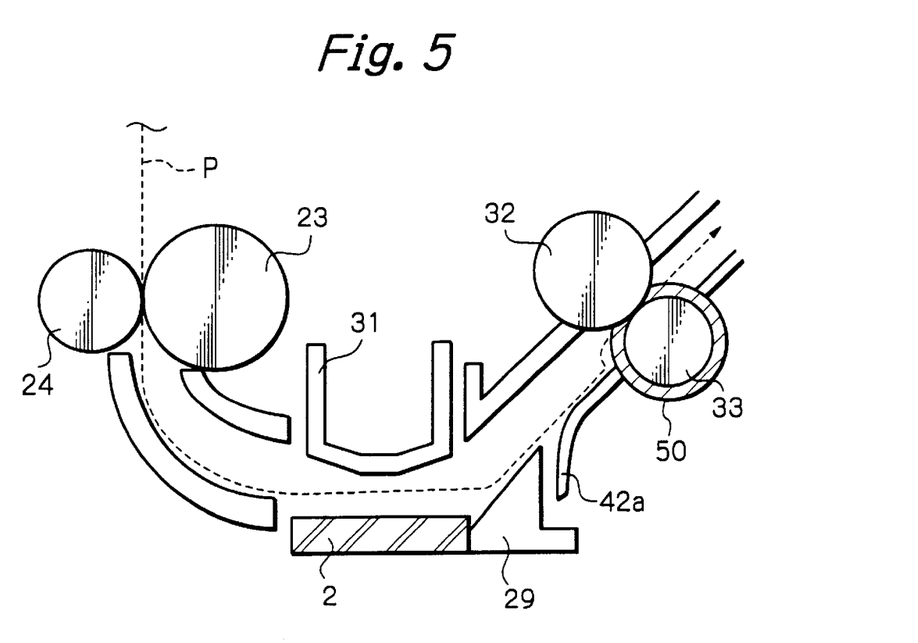
FIG. 5 is a view similar to FIG. 2, showing another alternative embodiment of the present invention.
Figure 6:
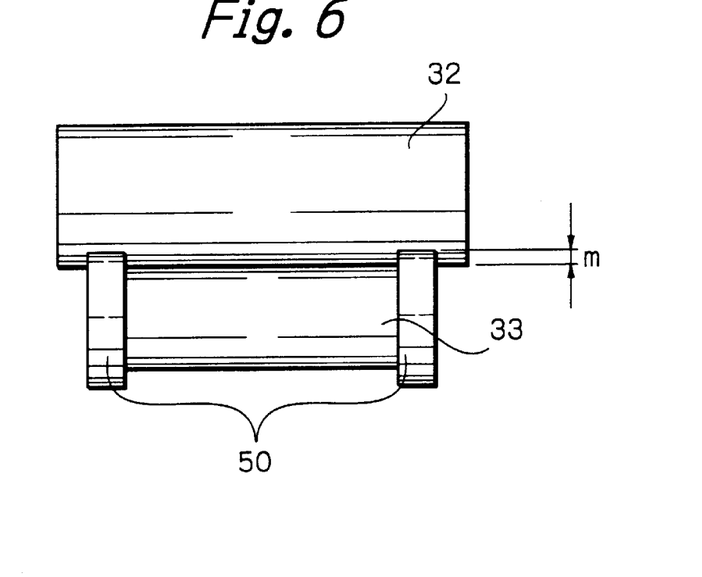
FIG. 6 is a bottom view of the embodiment shown in FIG. 5.

Reference will be made to FIGS. 5 and 6 for describing another alternative embodiment of the present invention. As shown, two driven rollers 50 are coaxially mounted on opposite axial ends of the driven roller 33 and have a larger outside diameter than the driven roller 33. In this configuration, the leading edge of the document P being conveyed by the first feed roller 23 and driven roller 24 contacts the driven rollers 50 before contacting the driven roller 33. If the driven rollers 50 have a coefficient of friction greater than at least the coefficient of friction of the driven roller 33, it is possible to reduce the slip of the leading edge of the document P. Also, if the driven rollers 50 are formed of an elastically deformable material, they are deformable by an amount m, FIG. 6, so as not to obstruct the conveyance by the second feed roller 33 and driven roller 33. The pressure that the driven rollers 50 exert should preferably be relatively low so as not to contaminate the document P.

As for the rest of the construction, this embodiment is also identical with the embodiment described with reference to FIGS. 1 and 2.

Still another alternative embodiment of the present invention will be described with reference to FIGS. 7 and 8. As shown, the driven rollers 50 have an axis 01 not coincident with the axis 02 of the driven roller 33. In this configuration, lines tangential to the second feed roller 32 and driven rollers 50 coincide with each other and prevent the driven rollers 50 from deforming. It follows that the driven rollers 50 are prevented from being permanently set when the ADF is left unused over a long period of time.

Figure 7:
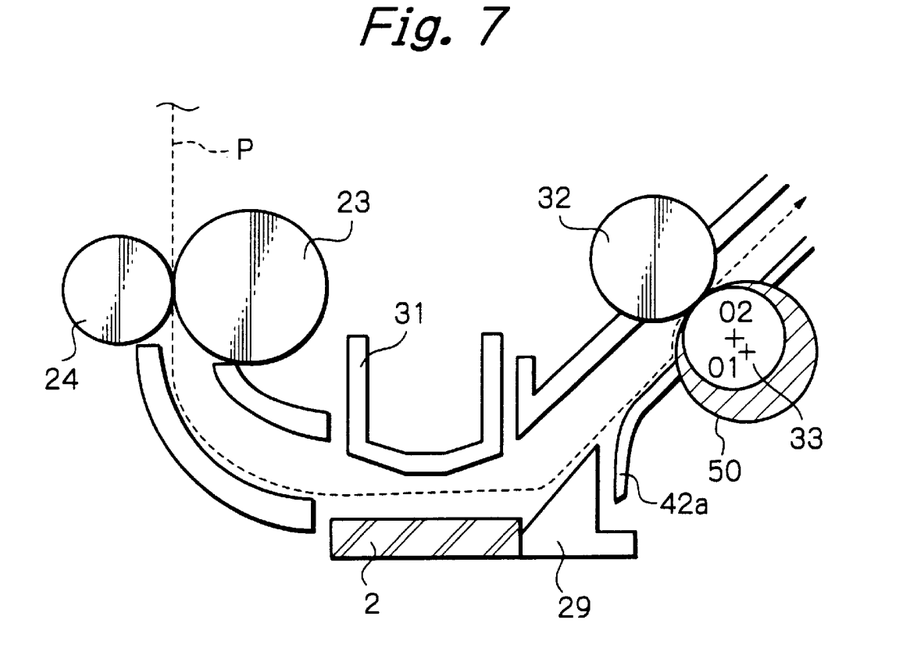
FIG. 7 is a view similar to FIG. 2, showing still another alternative embodiment of the present invention.
Figure 8:
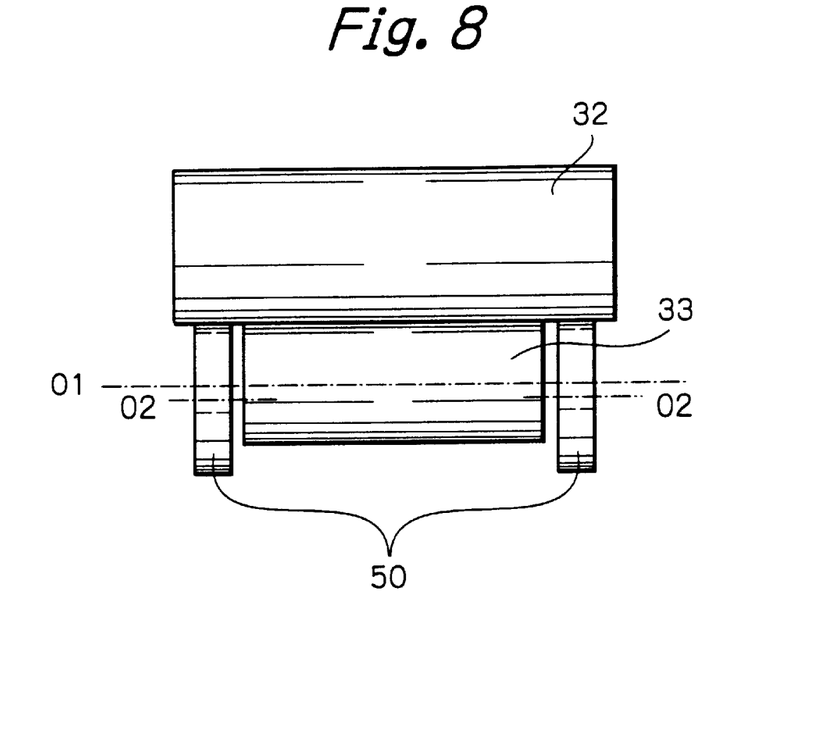
FIG. 8 is a bottom view of the embodiment shown in FIG. 7.

In FIG. 7, the axis 01 of the driven rollers 50 is shifted from the axis 02 of the driven roller 33 in the direction perpendicular to the direction of document feed. Alternatively, the axis 01 may be shifted from the axis 02 to the upstream side in the direction of document feed so long as the leading edge of the document P can contact the driven rollers 50 before the driven roller 33.

As for the rest of the construction, this embodiment is also identical with the embodiment of FIGS. 1 and 2 and the embodiment of FIGS. 5 and 6.

Figure 12:
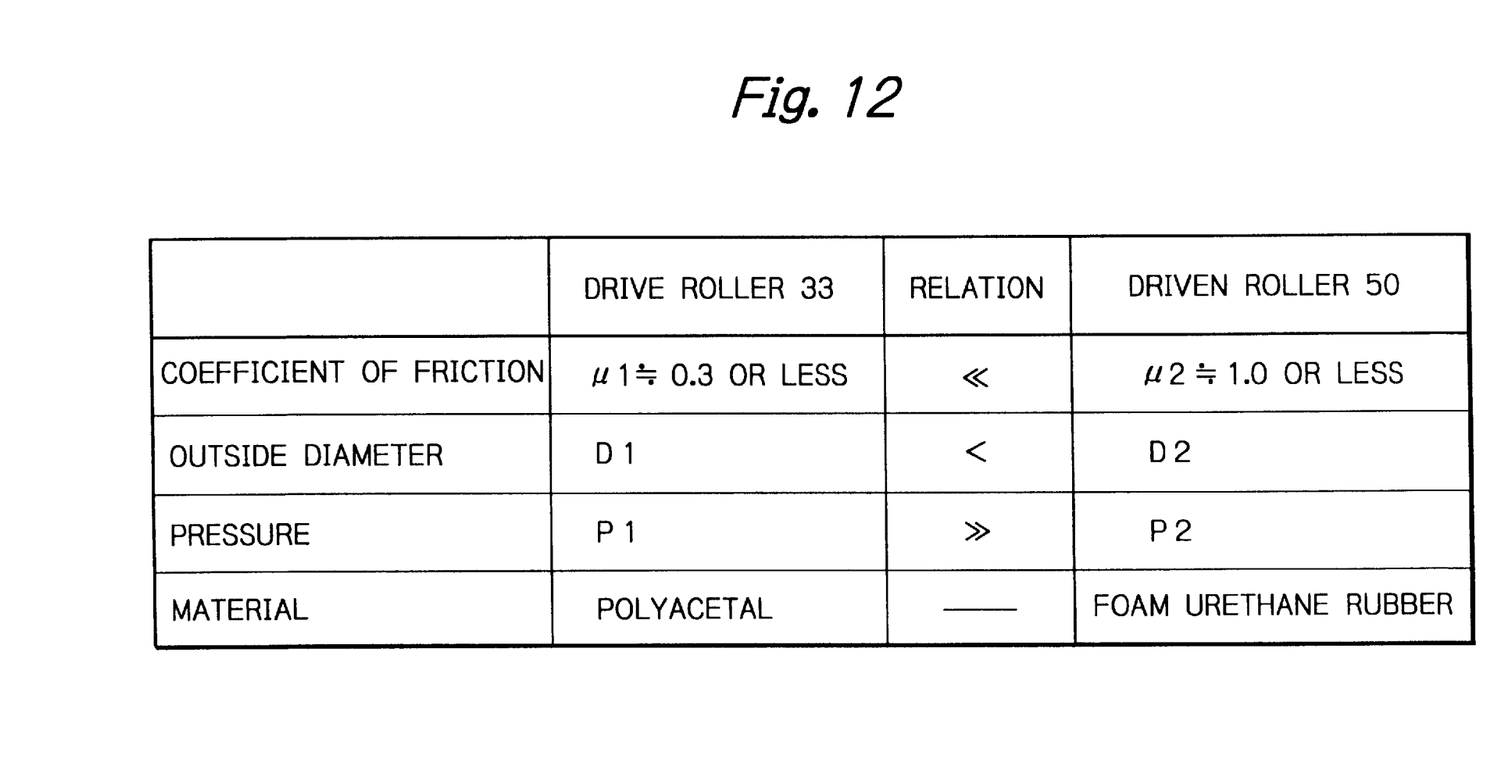
FIG. 12 is a table listing a relation between the driven rollers included in the embodiments of FIGS. 5 and 7.

In the embodiments shown in FIGS. 5–8, the driven rollers 50 may be implemented by sponge rollers formed of, e.g., foam rubber. FIG. 12 shows a preferable relation between the driven roller 33 and the driven rollers 50. Of course, the driven rollers 50 may be formed of any suitable material other than foam rubber so long as they satisfy the relation listed in FIG. 12.

Figure 9:
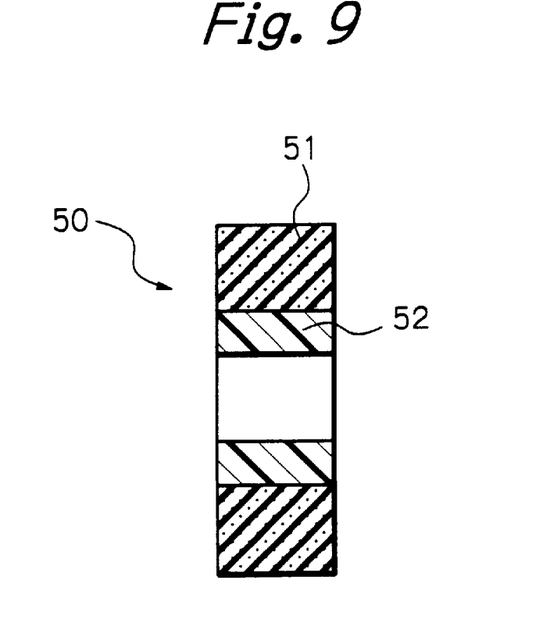
FIG. 9 is a section showing a specific configuration of a driven roller included in the embodiments shown in FIGS. 5 and 7.

FIG. 9 shows another specific configuration of the driven rollers or sponge rollers 50. As shown, each driven roller 50 is made up of a bearing portion or guide portion 52 formed of resin and a layer of foam rubber 51 covering the bearing portion 52.

Figure 10:
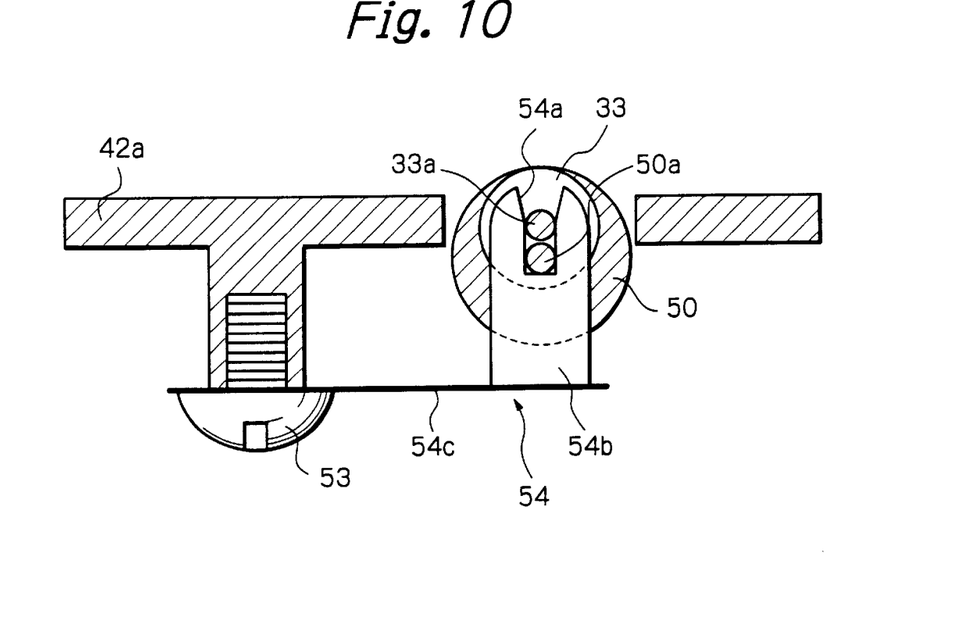
FIG. 10 is a fragmentary view showing a specific configuration of means for pressing driven rollers of FIG. 7 against a drive roller or second feed roller.

FIG. 10 shows a specific configuration of means for pressing the driven rollers 33 and 50 against the second feed roller 32. As shown, the driven roller 33 is rotatably mounted on a shaft 33a while the driven rollers 50 are rotatably mounted on a shaft 50a. A seat 54b is bifurcated to form guides 54a guiding the above shafts 33a and 50a, as illustrated. A bearing 54 supports the seat 54b via an elastic member 54c and is fastened to the guide plate 42a by a screw 53.

In the embodiments shown and described, the leading edge of the document P being conveyed via the slit glass 2 can be smoothly guided to the nip between the second feed roller 32 and driven roller 33 constituting the document send-out means. It is therefore possible to miniaturize the ADF while insuring reliable document conveyance, i.e., without effecting the document conveying speed.

In summary, it will be seen that the present invention provides a sheet-through type ADF for an image forming apparatus having various unprecedented advantages, as enumerated below.

(1) The ADF smoothly guides the leading edge of a document being conveyed by document send-in means via an image reading position to document send-out means. The ADF therefore insures accurate reading of the document by preventing the document from temporarily staying at the image reading position.

(2) One of a pair of rollers (driven roller) is held at an inoperative or retracted position when the leading edge of the document is conveyed toward the document send-out means along a guide surface. After document sensing means has sensed the leading edge of the document moved away form the above rollers, the above one roller is moved toward the other roller (second feed roller) and exerts a conveying force on the document. This is successful to prevent the document from temporarily staying at the image reading position due to its slip.

(3) An elastic guide plate directly guides the leading edge of the document to a nip between the above rollers. This not only prevents the document from staying when entering the document send-out means, but also obviates a jam because the elastic guide plate guides the document.

(4) The leading edge of the document contacts extra rollers before contacting the roller on which it is apt to slip. This also prevents the document from temporarily staying at the image reading position.

(5) Rollers different in outside diameter are integrally arranged with their axes deviated from each other. Therefore, lines tangential to the rollers coincide with each other at the nip. This makes it needless for the rollers having a larger diameter to deform and prevents them from being permanently set when the ADF is left unused over a long period of time.

(6) The rollers with the greater diameter and which the leading edge of the document contacts first are provided with a greater coefficient of friction than the other roller, so that the document is prevented from slipping. In addition, the rollers with the greater diameter exert a presser low enough to prevent the document from contamination.

(7) When the rollers with the greater diameter are formed of sponge, they achieve the greater coefficient of friction at low cost.

Various modifications will become possible for those skilled in the art after receiving the teachings of the present disclosure without departing from the scope thereof.

What is claimed is:

1. An ADF (Automatic Document Feeder) comprising:

document send-in means for sending a document to an image reading position while reversing said document;

a guide for guiding the document being sequentially read at the image reading position by scooping up said document;

document send-out means including a pair of rollers for sending out the document being guided by said guide; and document sensing means for sensing an arrival of a leading edge of the document at said document send-out means;

a lower roller of said pair of rollers being movable toward and away from an upper roller, wherein said lower roller is spaced from said upper roller when said document sensing means does not sense the leading edge of the document or moved toward said upper roller when said document sensing means senses said leading edge.

2. An ADF comprising:

document send-in means for sending a document to an image reading position;

document send-out means including a pair of rollers for sending out the document being sequentially read at the image reading position; and document sensing means for sensing an arrival of a leading edge of the document at said document send-out means;

one roller of said pair of rollers being movable toward and away from the other roller, wherein said one roller is spaced from said other roller when said document sensing means does not sense the leading edge of the document or moved toward said other roller when said document sensing means senses said leading edge.

3. An ADF comprising:

document send-in means for sending a document to an image reading position;

document send-out means including a pair of rollers for sending out the document being sequentially read at the image reading position; and an elastic guide plate for directly guiding a leading edge of the document to a nip between said pair of rollers, said elastic guide plate being bifurcated.

4. An ADF as claimed in claim 3, wherein said elastic guide plate has two ends that are positioned outside of opposite axial ends of at least one of said pair of rollers.

5. An ADF comprising:

document send-in means for sending a document to an image reading position; and document send-out means including a pair of rollers for sending out the document being sequentially read at the image reading position;

one roller of said pair of rollers comprises two kinds of rollers different in outside diameter from each other and arranged in a widthwise direction of the document.

6. An ADF as claimed in claim 5, wherein said two kinds of rollers have axes not coincident with each other.

7. An ADF as claimed in claim 6, wherein rollers of said two kinds of rollers having a larger outside diameter have a greater coefficient of friction and exert a lower pressure than a roller having a smaller outside diameter.

8. An ADF as claimed in claim 7, wherein said rollers having the larger outside diameter are formed of sponge.

9. An ADF as claimed in claim 5, wherein rollers of said two kinds of rollers having a larger outside diameter have a greater coefficient of friction and exert a lower pressure than a roller having a smaller outside diameter.

10. An ADF as claimed in claim 9, wherein said rollers having the larger outside diameter are formed of sponge.

11. An ADF comprising:

document send-in means for sending a document to an image reading position;

document send-out means including a pair of rollers for sending out the document being sequentially read at the image reading position; and an elastic guide plate for directly guiding a leading edge of the document to a nip between said pair of rollers, said elastic guide plate including a portion that extends to an outside of at least opposite axial ends of at least one of said pair of rollers.

* * * * *